United States Patent [19]

Oesch et al.

[11] Patent Number: 5,082,535
[45] Date of Patent: Jan. 21, 1992

[54] APPARATUS FOR THE EXTRACTION OF OIL OR POLYCHLORINATED BIPHENYL FROM ELECTRICAL PARTS THROUGH THE USE OF SOLVENTS AND FOR DISTILLATION OF THE SOLVENTS

[75] Inventors: Gustav Oesch, Zurich; Paul Gmeiner, Lieli; Urs Hofer, Zurich, all of Switzerland

[73] Assignee: Micafil, AG, Zurich, Switzerland

[21] Appl. No.: 622,282

[22] Filed: Dec. 6, 1990

Related U.S. Application Data

[60] Continuation of Ser. No. 397,116, Aug. 22, 1989, abandoned, which is a division of Ser. No. 190,080, May 4, 1988, Pat. No. 4,879,004.

[30] Foreign Application Priority Data

May 7, 1987 [CH] Switzerland .................. 01740/87

[51] Int. Cl.⁵ .................. B01D 1/22; B01D 3/10; B01D 11/00
[52] U.S. Cl. .................. 202/170; 134/12; 134/21; 134/108; 134/109; 159/5; 159/13.1; 159/49; 159/901; 159/DIG. 16; 159/DIG. 40; 202/185.1; 202/202; 202/205; 202/236; 203/89; 203/94; 203/98; 208/262.5; 210/909
[58] Field of Search .................. 202/170, 185.1, 202, 202/205, 236, 198; 203/89, 94, 98, 2, DIG. 7; 159/5, 13.1, 49, 901, DIG. 16, DIG. 40, 23, 28.1; 134/12, 21, 108, 109; 208/262.5; 210/909

[56] References Cited

U.S. PATENT DOCUMENTS

| | | | |
|---|---|---|---|
| 2,669,531 | 2/1954 | Petkus | 134/30 |
| 3,070,463 | 12/1962 | Barday | 134/11 |
| 3,329,528 | 7/1967 | Aldrich et al. | 134/222.5 |
| 4,292,744 | 10/1981 | Nabholz | 34/73 |
| 4,353,798 | 10/1982 | Foss | 208/262.5 |
| 4,405,448 | 9/1983 | Googin et al. | 208/262.5 |
| 4,424,633 | 1/1984 | Bernhardt et al. | 34/75 |
| 4,425,949 | 1/1984 | Rowe, Jr. | 141/1 |
| 4,430,208 | 2/1984 | Pytlewski et al. | 208/262.5 |
| 4,483,717 | 11/1984 | Olmsted et al. | 134/12 |
| 4,685,972 | 4/1987 | Fowler | 134/12 |
| 4,699,667 | 10/1987 | Walsh | 134/12 |
| 4,764,256 | 8/1988 | Way | 203/46 |
| 4,879,004 | 11/1989 | Oesch et al. | 203/89 |

FOREIGN PATENT DOCUMENTS

| | | |
|---|---|---|
| 0098811 | 1/1984 | European Pat. Off. . |
| 0106317 | 4/1984 | European Pat. Off. . |
| 0170808 | 7/1984 | European Pat. Off. . |
| 147942 | 7/1985 | European Pat. Off. . |
| 0186291 | 7/1986 | European Pat. Off. . |
| 0147860 | 3/1987 | European Pat. Off. . |
| 0221028 | 5/1987 | European Pat. Off. . |
| 3038493 | 2/1982 | Fed. Rep. of Germany . |
| 3422562 | 12/1984 | Fed. Rep. of Germany . |
| 2756298 | 3/1985 | Fed. Rep. of Germany . |
| 22808 | 1/1987 | Fed. Rep. of Germany . |
| 3540291 | 5/1987 | Fed. Rep. of Germany . |
| 3540425 | 5/1987 | Fed. Rep. of Germany . |
| 646068 | 11/1984 | Switzerland . |
| 784958 | 12/1980 | U.S.S.R. . |
| 363080 | 12/1931 | United Kingdom . |
| 470419 | 8/1937 | United Kingdom . |

Primary Examiner—Virginia Manoharan
Attorney, Agent, or Firm—Burns, Doane, Swecker & Mathis

[57] ABSTRACT

An apparatus for dissolving oil or PCB which exists in the electrical insulation of parts to be cleaned, wherein a solvent is evaporated during a heating phase by an evaporator located with the parts in an autoclave. The solvent vapor condenses on the parts and penetrates into the electrical insulation to form an oil or PCB-solvent mixture. The apparatus provides for a plurality of intermediate pressure reductions which are carried out in the autoclave, and during each intermediatre pressure reduction the solvent is simultaneously evaporated from the oil or PCB-solvent mixture, directly from the autoclave. That is, during each of the pressure reductions, the solvent supply is discontinued and the mixture circulated through a circulating line. Following the completion of each intermediate pressure reduction, the pure oil or PCB present in a condensate vessel is pumped out by an intermediately located feed pump through a connecting line and into a reservoir.

2 Claims, 2 Drawing Sheets

APPARATUS FOR THE EXTRACTION OF OIL OR POLYCHLORINATED BIPHENYL FROM ELECTRICAL PARTS THROUGH THE USE OF SOLVENTS AND FOR DISTILLATION OF THE SOLVENTS

This application is a continuation of application Ser. No. 07/397,116, filed Aug. 22, 1989, abandoned, which is a divisional of application Ser. No. 07/190,080, filed on May 4, 1988, which is now U.S. Pat. No. 4,879,004 which issued on Nov. 7, 1989.

BACKGROUND OF THE INVENTION

The invention relates to a process and apparatus for the extraction of oil or polychlorinated biphenyl (referred to hereinafter as PCB) from a dielectric liquid containing oil or PCB by means of a highly volatile solvent, and for the distillation of the solvent from the mixture of the solvent and the oil or PCB.

So-called askarel transformers and capacitors are known, in which a liquid dielectric containing a PCB is used. Because this non-combustible PCB is difficult to decompose biologically and because in an environmental fire within a certain temperature range highly toxic polychlorodibenzofurans and polychlorodibenzodioxins may be formed by the pyrogenic decomposition of the PCB, equipment of this type must be replaced within a short period of time or filled with a harmless dielectric replacement liquid.

To achieve this, EP 0147860 discloses, for example, a process for the replacement of a PCB by a high boiling dielectric liquid free of PCB. This process is applied, for example, in the case of an induction installation, in which the electric coil has been immersed with a porous, cellulose-like insulation into a container of an impregnating liquid containing PCB. Initially, the major portion of the impregnating liquid containing PCB is drained from the container. A dielectric liquid free of PCB is then filled into the container as an intermediate medium; this liquid being miscible with PCB and having an adequately low viscosity so as to flow in the container and penetrate into the interstices of the porous electric insulation. The inductive installation is next activated for a period of time sufficient to wash the PCB from an impregnated medium containing PCB within the porous insulation and absorb it into the intermediate medium. Subsequently, the intermediate medium containing the PCB washed from the container is drained. These process steps are repeated until the insulation is adequately cleaned, whereupon a permanent liquid free of PCB is filled into the container so that the electrical installation may be classified as free of PCB.

In oil-impregnated equipment, for example transformers, the insulation contains oil. In a condensation drying apparatus according to DE 27 56 298 (U.S. 4,292,744), not only is water removed from the insulation during drying, but in addition, the higher boiling liquid, for example oil, is also removed. The transformer to be cleaned in an autoclave is heated by means of the condensation heat of a solvent. During the heating, the solvent becomes mixed with the oil which is dissolved out of the insulation.

As the PCB or oil from the electric apparatus to be cleaned dissolves in the solvent present in the autoclave (container), it has been necessary heretofore to drain the oil or PCB-solvent mixture from the autoclave and to fill in a new solvent. This was done in order to assure optimal condensation of the solvent on the apparatus and thus to assure the dissolution of the higher boiling PCB's or oils from the apparatus, particularly from its insulation. In addition, the mixture drained off had to be regenerated by distillation.

An installation for the heating and drying of paper-insulated electro-technical parts according to DE 30 38 493 is also known, in which the low and high boiling components of the contaminated heating liquid are separated, and wherein for the evaporation of the heating liquid and for the separation of its vapor from high boiling components, a thin film evaporator is used.

A disadvantage of this installation consists in particular of the fact that a secondary evaporator is required in addition t the evaporator, with both of them being located outside the drying boiler.

OBJECTS AND SUMMARY OF THE INVENTION

Accordingly, it is an object of the present invention to improve the known processes and apparatuses for the purification of oil- or PCB-impregnated electrical apparatuses, so that the distillation of the solvent from mixtures of said solvent and oil or PCB may be carried out without the loss of energy and time, and without additional, separate and expensive distillation equipment.

In accordance with the present invention, during intermediate pressure reductions accurately defined relative to time in the heating phase, the oil or PCB-solvent mixture is further circulated over the heated evaporator, so that the vacuum required in the autoclave for the intermediate pressure reductions is also advantageously utilized for the distillation of the solvent.

A further advantage of the present invention is that both the solvent used for the cleaning, and the oil that is obtained exclusively in liquid form, may be reused. In addition, the PCB which is separated may be burned without difficulty in a suitable installation, whereby it is rendered harmless.

BRIEF DESCRIPTION OF THE DRAWINGS

Other objects and advantages of the present invention will become apparent from the following detailed description of a preferred embodiment as described in conjunction with the accompanying drawings in which.

DESCRIPTION OF THE PREFERRED EMBODIMENT

Figure 1:
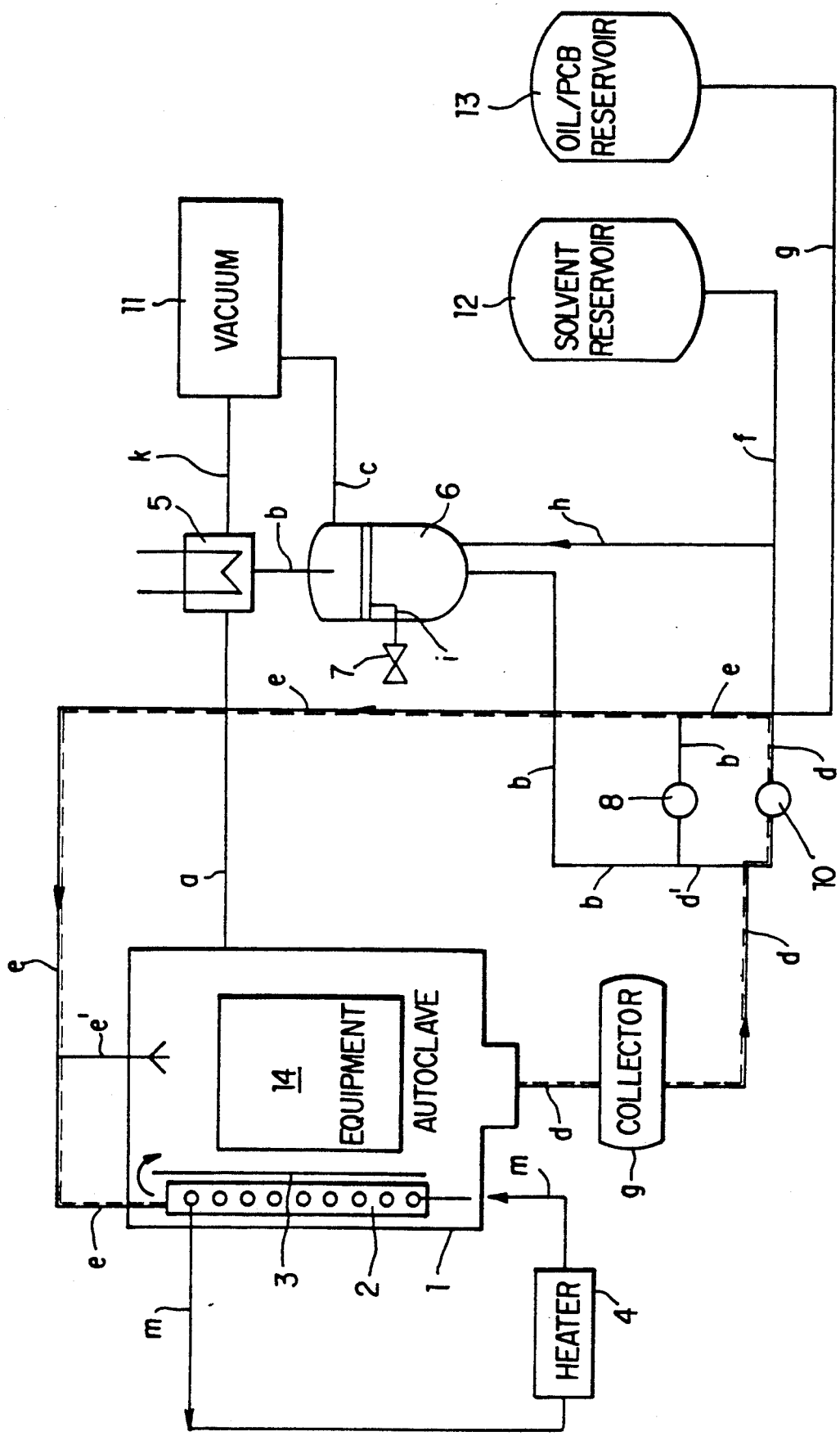
FIG. 1 shows a fundamental diagram of an extraction and distillation apparatus according the invention.

In FIG. 1, an autoclave is designated by the reference (1). An evaporator installation (2, 3, 4, m) consists of at least one evaporator, for example a film evaporator (2), which is connected by means of a heating line (m) with a heating apparatus (4). The film evaporator (2) is mounted vertically on an internal wall of the autoclave (1) and is equipped on its side facing the equipment to be cleaned (14), for example transformers and/or capacitors, with a partition (3).

The autoclave (1) with the film evaporator (2) is connected by means of a steam line (a) with a steam condenser (5). The steam condenser (5) is connected by means of a first condensate drain (b) located within a separator (6), and a first feed pump (8), through a return line (e) to the autoclave (1). A spray line (e') opens from the return line (e) in the autoclave (1). The spray line (e') opens over the equipment to be cleaned. A circulating line (shown in FIG. 1 as a broken line) is connected with the autoclave (1), and leads from the autoclave (1) through a second condensate drain (d), an intermediately located condensate collector vessel (9) and a second feed pump (10), to the return line (e) which leads into the film evaporator (2) within the autoclave (1). The condensate drain (d) is also connected by means of the first feed pump (8) with the return line (e).

The water separated in the separator (6) is drained off through a drain (i) equipped with a valve (7). A vacuum installation (11) composed of various known components is further provided. The vacuum installation is connected firstly with the steam condenser (5) by means of a vacuum line (k) and by means of the steam line (a) with the autoclave (1), and secondly through a third condensate drain (c) with a separator (6).

A connecting line (f) connects a first reservoir (12) for solvent by means of the return line (e) with the film evaporator (2) located in the autoclave (1) and is additionally connected through a connecting line (h) with the separator (6) of the steam condenser (5). From a second reservoir (13) for the oil or the PCB, a connecting line (g) leads through the condensate drain (d) and the condensate collector vessel (9) to the autoclave (1).

The operation of the preferred embodiment will be described with reference to FIGS. 1 and 2.

In the film evaporator (2), the solvent which is heated to a temperature of between 40° and 130° C. is evaporated and condenses on the equipment to be cleaned (14), in particular the electric insulation. The parts to be cleaned are thus heated, and simultaneously the solvent vapor condensing on them dissolves the oil or the PCB from the insulation. With rising temperatures, the oil or the relatively highly viscous PCB flow more readily and may be dissolved more easily from the insulation. Metallic surfaces are also freed of the oil or PCB adhering to them. The solvent may be drawn from the reservoir (12) through the connecting lines (f, h) to the separator (6). A hydrocarbon derivative, preferably a chlorinated hydrocarbon solvent, or a halogenated hydrocarbon, preferably tetrachloroethylene is used as the volatile solvent.

The water vapor escaping from the insulation to be purified is removed from the autoclave together with part of the solvent vapor by the steam drain (a) and condenses in the steam condenser (5) under a pressure of 50 to 100 mbar, whereby the two liquids are separated in the separator (6). The solvent is then recycled by the first feed pump (8) through the condensate drain (b) and the return line (e) to the film evaporator (2).

Figure 2:
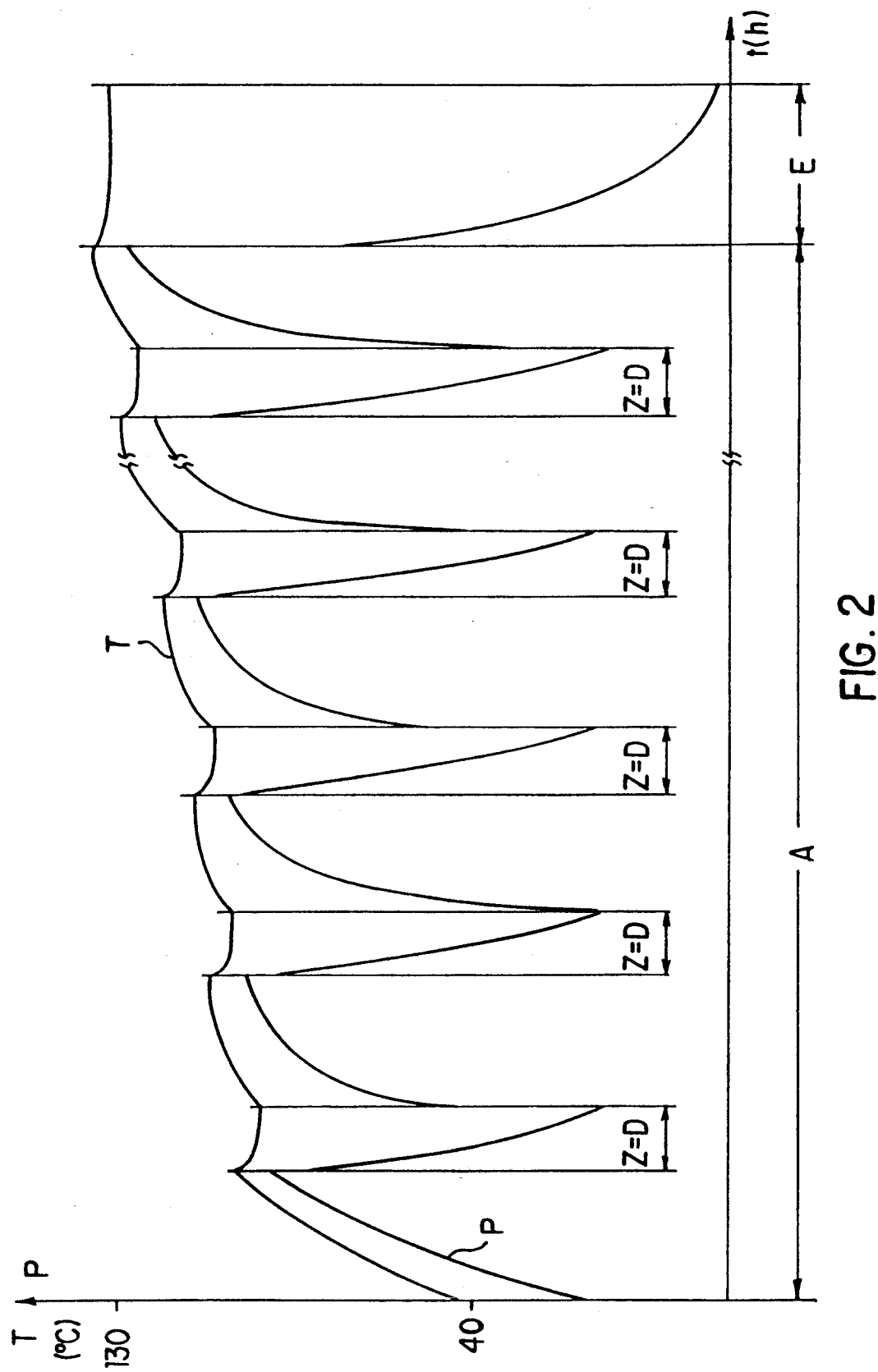
FIG. 2 shows a graph of temperature and pressure for a heating/extraction phase (A) and a vacuum phase (E) of the apparatus according to FIG. 1.

During this heating/extraction phase (A), several intermediate pressure reductions (Z) as seen in FIG. 2, are carried out in the autoclave (1) by interrupting in each instance the supply of the solvent from the separator (6) to the film evaporator (2) and effecting intermediate pressure reductions at given times within the autoclave to intensify the oil or PCB extraction from the parts to be purified. The pressure, as determined through the steam drain (a) in the autoclave (1), is thereby reduced to a range of between 1 and 100 mbar.

During this intermediate pressure reduction (Z), a distillation phase (D) takes place, whereby through the circulation of the oil or PCB-solvent mixture present in the autoclave (1) and the condensate collector vessel (9) over the heated film evaporator (2), the solvent vapor is distilled off through the steam drain (a) and condensed in the steam condenser (5). The oil or PCB-solvent mixture is circulated from the autoclave (1) through the condensate drain (d) with the intermediately located condensate collector vessel (9), through the second feed pump (10) located in the condensate drain (d) and further though the return line (e) into the heated film evaporator (2) located in the autoclave (1).

Following the completion of each intermediate pressure reduction (Z), the pure oil or PCB present in the condensate collector vessel (9) is removed by the second feed pump (10) through the connecting line (g) into the reservoir (13). Furthermore, following each intermediate pressure reduction (Z) and distillation of the solvent, solvent is introduced by means of the spray line (e') to dilute and cool the relatively highly viscous oil or PCB still present on the material to be cleaned, and to cool down the material being cleaned.

After the completion of the heating/extraction phase, the supply of the solvent by the first feed pump (8) to the film evaporator (2) is interrupted and a final pressure reduction with a subsequent terminal vacuum phase (E) in the autoclave (1) takes place. The solvent that has penetrated into the equipment being cleaned, particularly the insulation, is evaporated and is removed from the autoclave (1) through the steam drain (a), to be condensed in the steam condenser (5) and the condensers of the vacuum installation (11).

It will be appreciated by those of ordinary skill in the art that the present invention can be embodied in other specific forms without departing from the spirit or essential characteristics thereof. The presently disclosed preferred embodiment is therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Apparatus for the extraction of oil or a polychlorinated biphenyl (PCB) from parts impregnated with an oil or PCB-containing dielectric liquid using a volatile solvent, and for distilling the volatile solvent from an oil or PCB-solvent mixture, said apparatus comprising:

an evacuable autoclave wherein parts to be purified are located;

a heated film evaporator being located in the autoclave and being fed with the solvent or the oil or PCB-solvent mixture;

an evacuable steam condenser for condensing solvent vapor received from the autoclave;

a vacuum device acting upon the steam condenser and the autoclave;

first pump means for recycling the condensed solvent back to the heated evaporator to intensify oil or PCB extraction from the parts to be purified and for discontinuing the solvent feed to the heated evaporator to effect together with the vacuum device intermediate pressure reduction phases at given times within the autoclave;

second pump means for circulating the oil or PCB-solvent mixture from the autoclave to the heated evaporator during each intermediate pressure reduction phase to effect distillation of solvent vapor produced in the heated evaporator off the circulating oil or PCB mixture; and a condensate collector vessel connected to the autoclave and to the second pump means for collecting oil or PCB from the oil or PCB solvent mixture during each intermediate pressure reduction phase.

2. Apparatus according to claim 1, further comprising a circulating line consisting of a condensate drain leading from the autoclave to a condensate collector vessel located therein.

* * * * *